United States Patent
Chang (10) Patent No.: US 9,104,219 B2
(45) Date of Patent: Aug. 11, 2015

(54) POWER CONVERTER HAVING MULTI-PHASE OUTPUT STAGE AND OPERATING METHOD THEREOF

(71) Applicant: uPI Semiconductor Corporation, Zhubei, Hsinchu County (TW)

(72) Inventor: Chih-Lien Chang, Zhubei (TW)

(73) Assignee: UPI SEMICONDUCTOR CORPORATION, Zhubei, Hsinchu County (TW)

( * ) Notice: Subject to any disclaimer, the term of this patent is extended or adjusted under 35 U.S.C. 154(b) by 218 days.

(21) Appl. No.: 13/798,464

(22) Filed: Mar. 13, 2013

(65) Prior Publication Data

US 2013/0335042 A1   Dec. 19, 2013

(30) Foreign Application Priority Data

Jun. 15, 2012   (TW) .............................. 101121513 A (51) Int. Cl.
G05F 1/00 (2006.01)
G05F 1/46 (2006.01)

(52) U.S. Cl.
CPC ..................... G05F 1/461 (2013.01)

(58) Field of Classification Search
USPC .............. 323/242, 243, 269–272, 274, 275, 323/282–285, 288, 322, 323, 326
See application file for complete search history.

(56) References Cited

U.S. PATENT DOCUMENTS

| | | | |
|---|---|---|---|
| 6,897,636 B2 * | 5/2005 | Harris | 323/272 |
| 7,023,188 B1 * | 4/2006 | Rice | 323/271 |
| 7,453,250 B2 | 11/2008 | Qui et al. | |
| 7,471,133 B1 | 12/2008 | Moussaoui et al. | |
| 7,602,624 B2 | 10/2009 | Nakashima | |
| 7,868,600 B2 * | 1/2011 | Qiu et al. | 323/282 |
| 2002/0125869 A1 * | 9/2002 | Groom et al. | 323/283 |
| 2002/0135338 A1 * | 9/2002 | Hobrecht et al. | 323/272 |
| 2003/0185024 A1 * | 10/2003 | Lethellier | 363/65 |
| 2007/0013356 A1 * | 1/2007 | Qiu et al. | 323/288 |
| 2009/0224731 A1 * | 9/2009 | Tang et al. | 323/241 |
| 2011/0080151 A1 * | 4/2011 | Rahardjo et al. | 323/285 |

FOREIGN PATENT DOCUMENTS

TW      I337692 B    2/2011

OTHER PUBLICATIONS

TW Office Action dated May 9, 2014.

* cited by examiner

Primary Examiner — Adolf Berhane
Assistant Examiner — Gary Nash
(74) Attorney, Agent, or Firm — McClure, Qualey & Rodack, LLP (57) ABSTRACT

A power converter including a multi-phase output stage, a comparator, and a time calculating unit is disclosed. The multi-phase output stage includes a plurality of channels. The comparator compares a first input signal with a second input signal to provide a setting signal. The time calculating unit adjusts on time duty cycles of the channels with the variation of the load according to the setting signal. When the load becomes larger, the frequency that the comparator provides the setting signal will be increased to cause that the on time duty cycles of the channels are overlapped.

16 Claims, 10 Drawing Sheets

POWER CONVERTER HAVING MULTI-PHASE OUTPUT STAGE AND OPERATING METHOD THEREOF

BACKGROUND OF THE INVENTION

1. Field of the Invention

The invention relates to a DC-DC converter; in particular, to a power converter having faster transient response and capable of enhancing the output limitation of output voltage and an operating method thereof.

2. Description of the Prior Art

In recent years, power supply circuits have been widely used in different electronic products, such as portable electronic products, or computer products. The power supply circuit can provide voltage or current conversion or provide power of fixed voltage or current for the electronic products to operate. In the power supply circuits, a power integrated circuit is one of the necessary active components.

In the conventional multi-phase constant on-time (COT) structure, the pulse-width modulation (PWM) output of each phase channel all uses the same on-time calculation circuit to calculate the on-time. When new on-time is triggered, the distributor of the on-time calculation circuit will distribute the on-time to the specified phase channel in order. However, because each phase channel needs to use the same on-time calculation circuit to calculate the on-time of the PWM signals in order, there is only the PWM signal of certain phase channel at high level at the same time, and the PWM signals of the other phase channels are all at low level; that is to say, the on-time duty cycles of the PWM signals of each phase channel will be not overlapped. Therefore, this conventional COT structure will form serious output limitation to the output voltage of the power converter.

Figure 1:
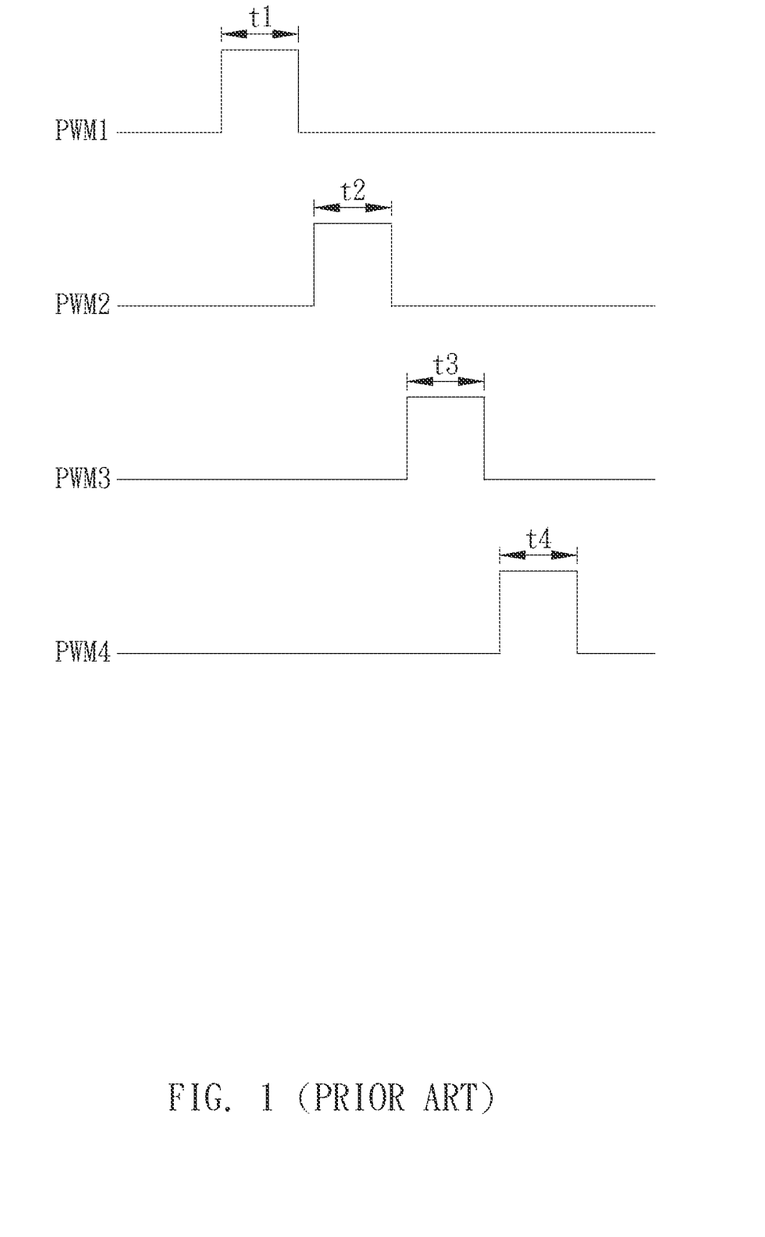
FIG. 1 illustrates a schematic diagram of the on-time duty cycles of each phase outputted by the power converter failing to be overlapped in the conventional multi-phase constant on-time (COT) structure.

For example, as shown in FIG. 1, if the conventional multi-phase COT structure includes 4 phase channels, and the PWM output signals corresponding to the four phase channels are PWM1~PWM4 respectively, the maximum duty cycle t1~t4 of the on-times of the PWM output signals of each phase channel is only 25% of the entire duty cycle. If the input voltage is 5V, the output voltage of each phase channel can be only 1.25V or still lower. It forms serious output limitations to the output voltage. In addition, as to the transient response, although the conventional COT structure has faster response than the fixed frequency system, once the output voltage of the constant on-time structure is increased, the advantage of the conventional constant on-time structure will be disappear even reversed.

SUMMARY OF THE INVENTION

Therefore, the invention provides a power converter and an operating method thereof to solve the above-mentioned problems occurred in the prior arts.

A scope of the invention is to provide a power converter. In a preferred embodiment, the power converter includes a multi-phase output stage, a comparator, and a time calculating unit. The multi-phase output stage includes a plurality of channels. The comparator compares a first input signal with a second input signal to provide a setting signal. The time calculating unit is coupled to the comparator and the multi-phase output stage and used for adjusting on-time duty cycles of the channels with the variation of the load according to the setting signal. When the load becomes larger, the frequency that the comparator provides the setting signal will be increased to cause that the on-time duty cycles of the channels are overlapped.

In an embodiment, two input terminals of the comparator are coupled to an error amplifier and a ramp generator, the first input signal and the second input signal compared by the comparator are an error signal generated by the error amplifier according to a reference voltage and an output voltage of the power converter and a ramp signal generated by the ramp generator respectively.

In an embodiment, the first input signal and the second input signal compared by the comparator are a reference voltage and an output voltage of the power converter respectively.

In an embodiment, the power converter includes a multiplex processing unit. The multiplex processing unit is coupled to the comparator, the time calculating unit, and the multi-phase output stage, for setting a plurality of pulse-width modulation (PWM) signals corresponding to the channels at high level according to the setting signal received from the comparator respectively and setting the PWM signals corresponding to the channels at low level according to a reset signal received from the time calculating unit respectively.

In an embodiment, the time calculating unit includes a plurality of time calculators. When the multiplex processing unit sets a first PWM signal of the PWM signals at high level, the time calculators will calculate a plurality of times corresponding to the first PWM signal in order and output the reset signal to the multiplex processing unit.

In an embodiment, there is a time gap existed between the times calculated by the time calculators.

In an embodiment, the times calculated by the time calculators are continuous.

In an embodiment, the multiplex processing unit includes a first multiplexer and a second multiplexer, the first multiplexer is coupled to the comparator, the time calculating unit, and the channels and used to set the PWM signals corresponding to the channels at high level according to the setting signal respectively, and the second multiplexer is coupled to the time calculating unit and the channels and used to set the PWM signals corresponding to the channels at low level according to the reset signal received from the time calculating unit respectively.

In an embodiment, if the number of the time calculators is M, and M is a positive integer larger than 1, after a first time calculator of the time calculators calculates a first period of time corresponding to the first PWM signal according to the setting signal and enters into an idle state, and a second time calculator though a Mth time calculator of the time calculators calculate a second period of time through a Mth period of time corresponding to the first PWM signal in order and enter into the idle state respectively, after the Mth time calculator calculates the Mth period of time, the Mth time calculator will output the reset signal to the multiplex processing unit.

In an embodiment, when the multiplex processing unit sets a second PWM signal of the PWM signals at high level according to the setting signal, if the first time calculator is under the idle state, the first time calculator will calculate the first period of time corresponding to the second PWM signal according to the setting signal and enter into the idle state, and the second time calculator though the Mth time calculator of the time calculators calculate the second period of time through the Mth period of time corresponding to the second PWM signal in order and enter into the idle state respectively, after the Mth time calculator calculates the Mth period of time, the Mth time calculator will output the reset signal to the multiplex processing unit to make the multiplex processing unit set the second PWM signal under low level according to the reset signal.

In an embodiment, at least one time calculator among the time calculators of the time calculating unit is related to an output voltage and an input voltage of the power converter.

In an embodiment, the time calculators of the time calculating unit are not related to an output voltage and an input voltage of the power converter.

Another scope of the invention is to provide an operating method for a power converter. In a preferred embodiment, the power converter includes a multi-phase output stage and a time calculating unit, and the multi-phase output stage includes a plurality of channels. The operating method includes steps of: (a) comparing a first input signal with a second input signal and selectively providing a setting signal, wherein when a load becomes larger, the frequency of the setting signal will be increased to cause that on-time duty cycles of the channels are overlapped; (b) making the power converter adjust the on-time duty cycles of the channels with variation of the load according to the setting signal.

Compared to the prior arts, the power converter disclosed in the invention can perform on-time calculations on certain PWM signal during several periods of time in order through the time calculators of the on-time calculating unit. When the first time calculator finishes the calculation of a period of time and the second time calculator continues to perform the calculation of another period of time, the first time calculator will enter into the idle state and it can start to perform on-time calculation on another PWM signal immediately. By doing so, the PWM output signals corresponding to different phase channels can be operated at high level at the same time, namely the on time duty cycles of each phase channel can be overlapped to each other, so that the output limitations to the output voltage caused by the conventional constant on-time structure can be effectively improved. When load transient happens, since the on-time duty cycles of each phase channel in the invention can be overlapped to each other, the speed of the transient response can be effectively increased. In addition, since the same on-time calculating unit is used to calculate the on-times of each phase channel in the invention, not only the used circuit area can be reduced, but also the difference between the on-times of each phase channel can be reduced. Furthermore, the invention can also provide output time difference between the phase channels to suppress the loop over-output phenomenon.

The advantage and spirit of the invention may be understood by the following detailed descriptions together with the appended drawings.

DETAILED DESCRIPTION OF THE INVENTION

A preferred embodiment of the invention is a power converter. In fact, the power converter of the invention is applied in a power IC, but not limited to this. The invention can be applied in power conversion circuit structures of the AC-DC converter or the DC-AC converter.

Figure 2:
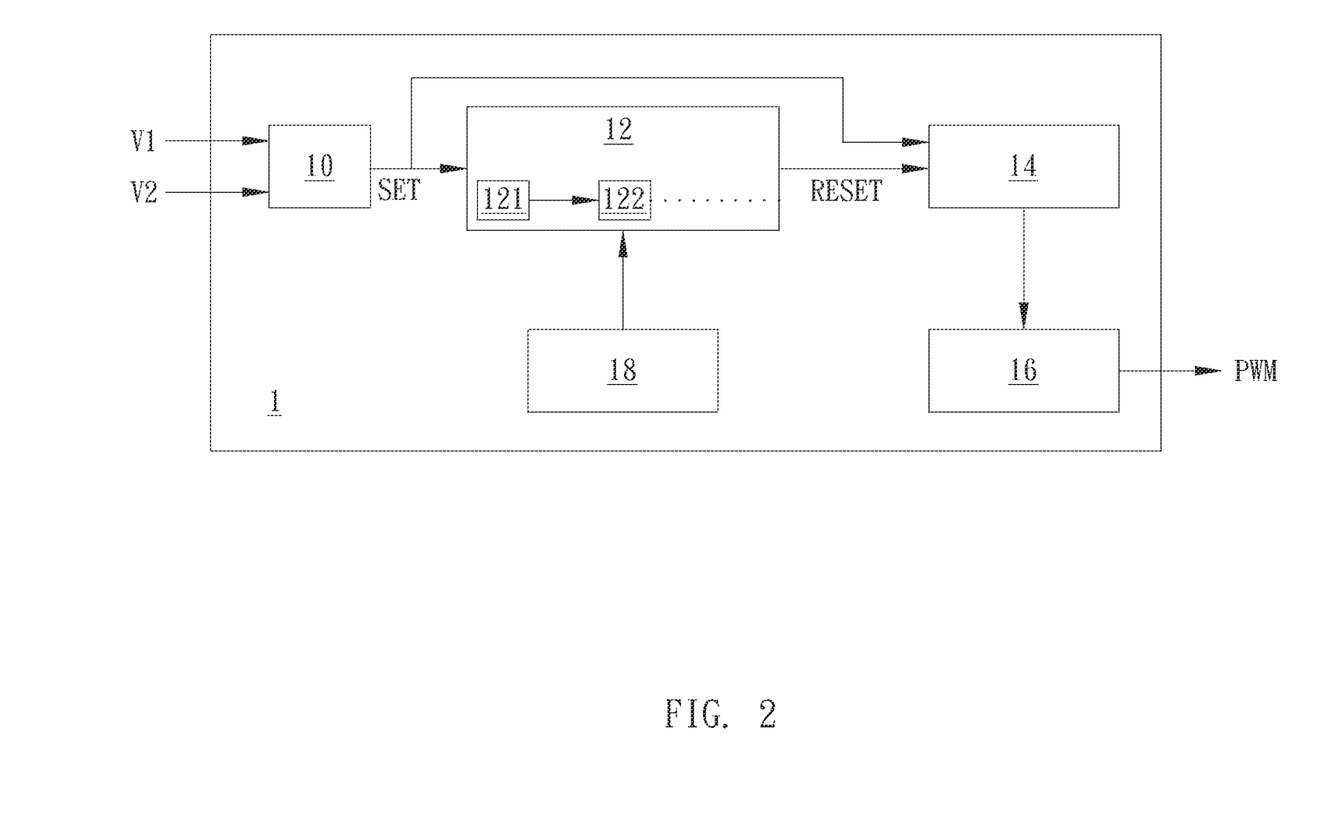
FIG. 2 illustrates a functional block diagram of the power converter in an embodiment of the invention.
Figure 3:
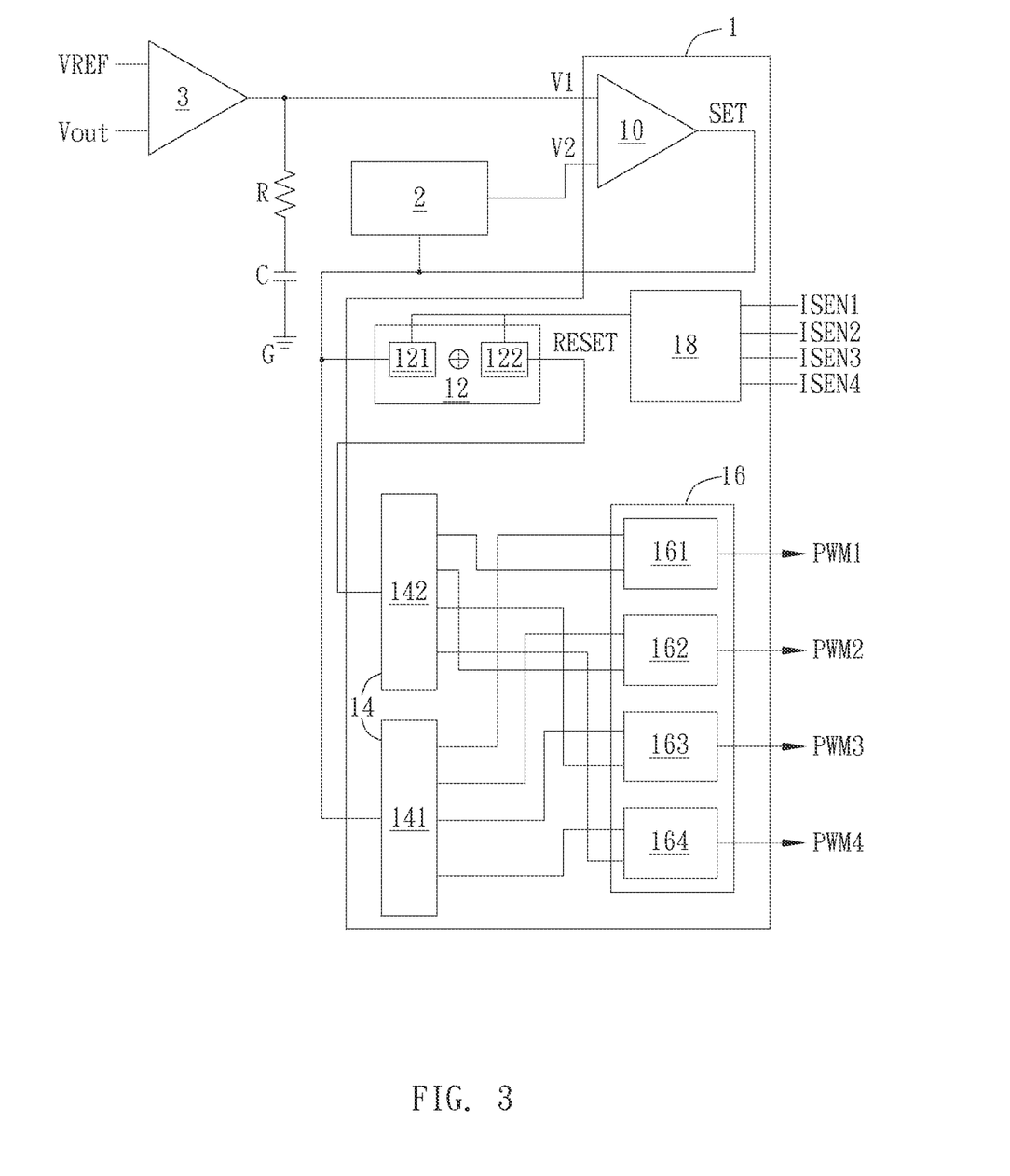
FIG. 3 illustrates an embodiment of the power converter including four phase channels and two time calculators.
Figure 4:
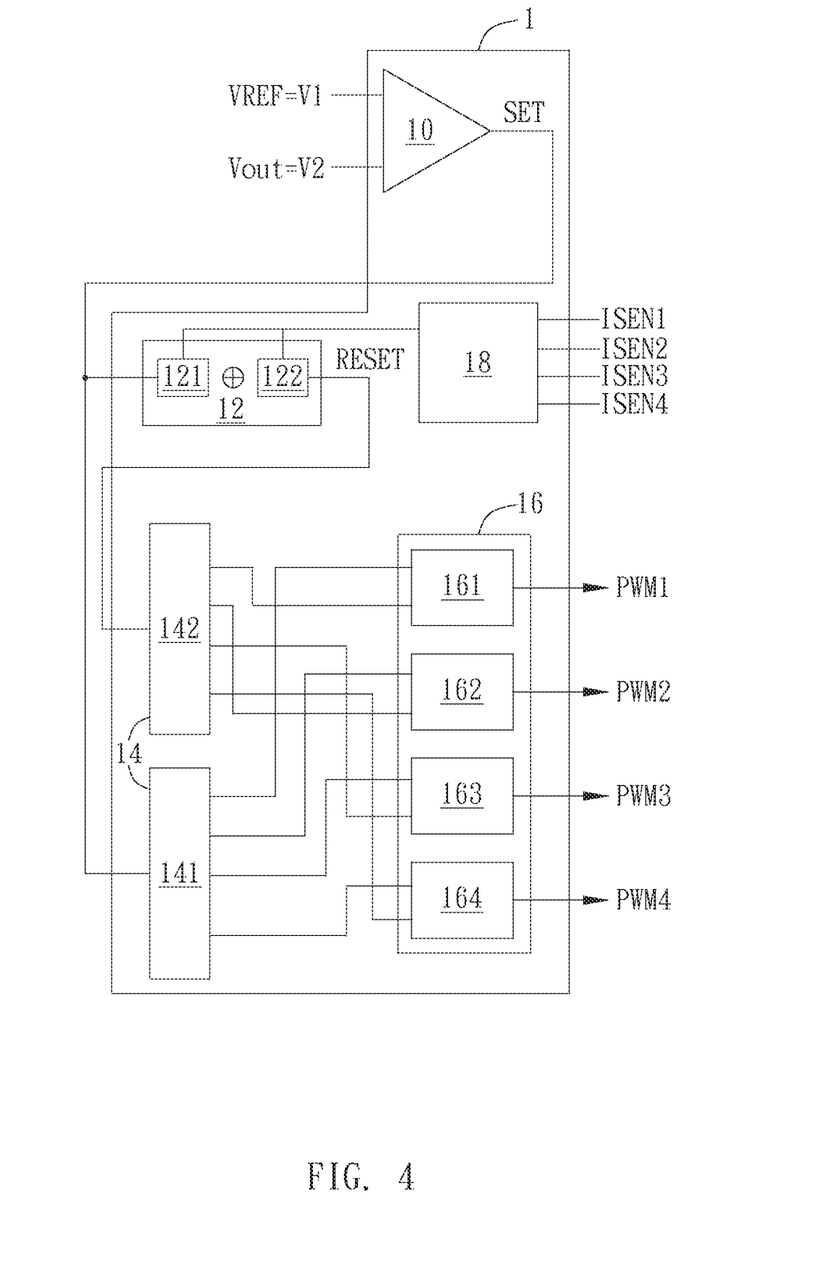
FIG. 4 illustrates another embodiment of the power converter including four phase channels and two time calculators.
Figure 5:
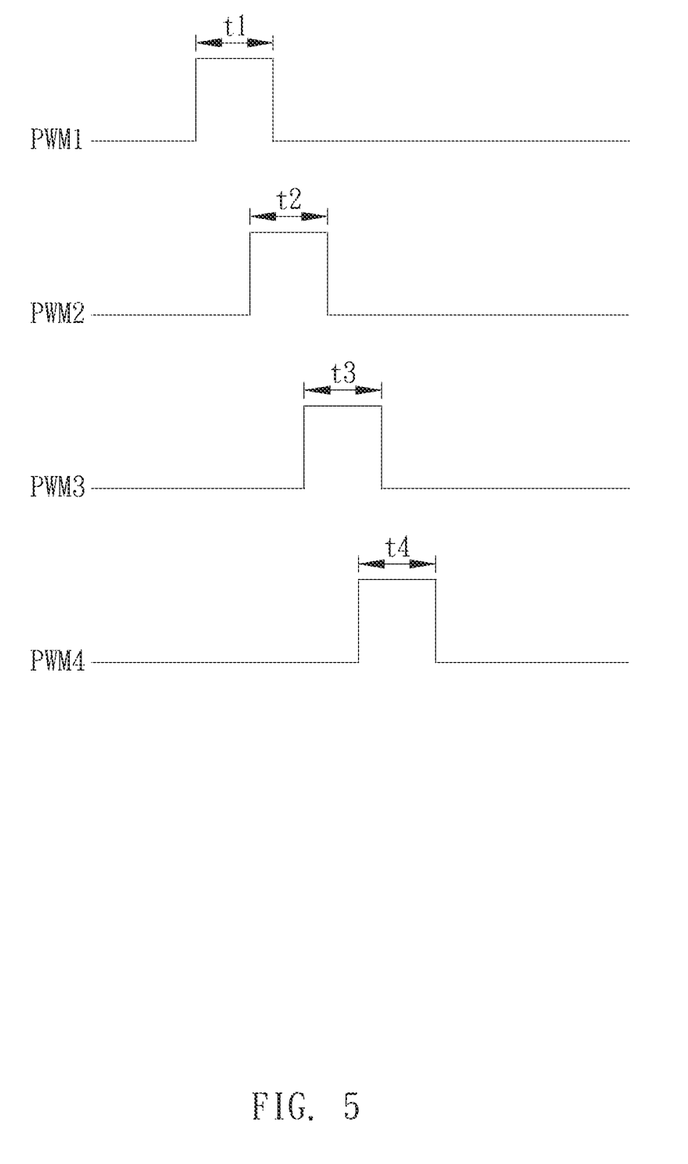
FIG. 5 illustrates a schematic diagram of the overlapped on-time duty cycles of each phase outputted by the power converter of the invention.

Please refer to FIG. 2 through FIG. 5. FIG. 2 illustrates a functional block diagram of the power converter in an embodiment of the invention; FIG. 3 illustrates an embodiment of the power converter including four phase channels and two time calculators; FIG. 4 illustrates another embodiment of the power converter including four phase channels and two time calculators; FIG. 5 illustrates a schematic diagram of the overlapped on-time duty cycles of each phase channel outputted by the power converter of the invention. In fact, the number of the phase channels of the power converter can be two or more, the number of the time calculators of the time calculating unit can be two or more. It depends on practical needs and not limited to this case.

AS shown in FIG. 2, the DC-DC converter 1 includes a comparator 10, a time calculating unit 12, a multiplex processing unit 14, a multi-phase output stage 16, and a current balance unit 18. The time calculating unit 12 includes a plurality of time calculators 121, 122 . . . which are coupled to each other. The comparator 10 is coupled to the time calculating unit 12 and the multiplex processing unit 14 respectively; the time calculating unit 12 is coupled to the multiplex processing unit 14; the multiplex processing unit 14 is coupled to the multi-phase output stage 16; the current balance unit 18 is coupled to the time calculating unit 12. The comparator 10 receives a first input signal V1 and a second input signal V2 and provides a setting signal SET to the time calculating unit 12 and the multiplex processing unit 14; the time calculating unit 12 receives the setting signal SET and outputs a reset signal RESET to the multiplex processing unit 14; the multi-phase output stage 16 outputs a PWM signal.

In this embodiment, at the first time, the comparator 10 receives the first input signal V1 and the second input signal V2 and compares the first input signal V1 and the second input signal V2 to determine whether the first input signal V1 is higher than the second input signal V2.

In an embodiment, as shown in FIG. 3, two input terminals of the comparator 10 can be coupled to an error amplifier 3 and a ramp generator 2 respectively. The resistor R and the capacitor C can be coupled to the node between the error amplifier 3 and the comparator 10 and the ground terminal G in series. The first input signal V1 and the second input signal V2 compared by the comparator 10 can be an error signal generated by the error amplifier 3 according to a reference voltage VREF and an output voltage Vout of the DC-DC converter 1 and a ramp signal generated by the ramp generator 2 respectively, wherein the ramp signal can be also called the triangular wave signal or the saw-wave signal. In another embodiment, as shown in FIG. 4, the first input signal V1 and the second input signal V2 compared by the comparator 10 are a reference voltage VREF and an output voltage Vout of the DC-DC converter 1 respectively.

As shown in FIG. 3, if the time calculating unit 12 includes the first time calculator 121 and the second time calculator 122 coupled to each other; the multiplex processing unit 14 includes a first multiplexer 141 and a second multiplexer 142; the multi-phase output stage 16 includes a first phase channel 161, a second phase channel 162, a third phase channel 163, and a fourth phase channel 164. The output terminal of the comparator 10 is coupled to the first time calculator 121 and the first multiplexer 141; the second time calculator 122 is coupled to the second multiplexer 142; the first multiplexer 141 is coupled to the first phase channel 161, the second phase channel 162, the third phase channel 163, and the fourth phase channel 164 respectively; the current balance unit 18 is coupled to the first time calculator 121 and the second time calculator 122. As shown in FIG. 5, in this embodiment, the duty cycles t1~t4 of the on-times of the PWM signals PWM1~PWM4 of the phase channels 161~164 outputted by the DC-DC converter 1 can be overlapped to each other.

Figure 6:
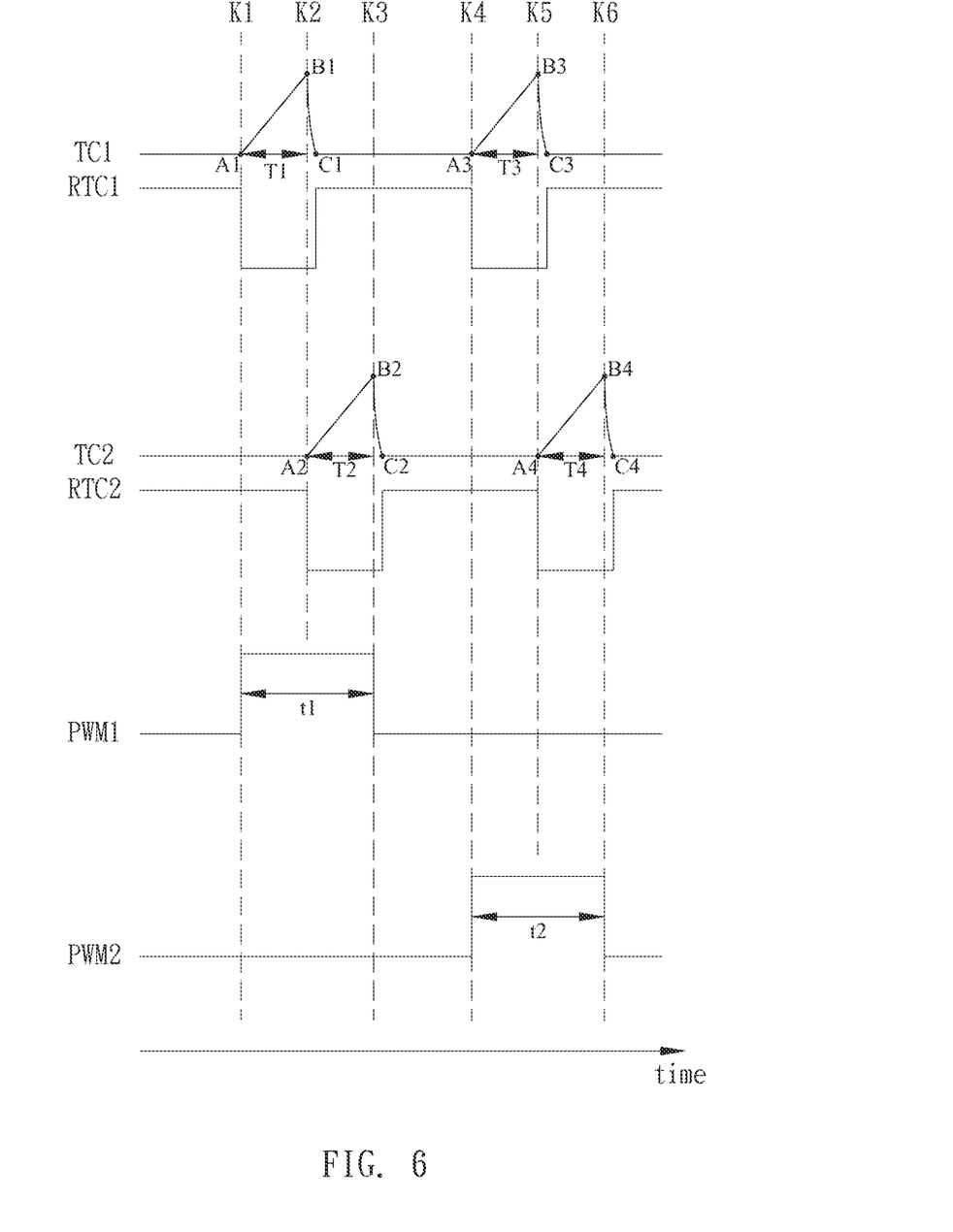
FIG. 6 illustrates that the first time calculator and the second time calculator calculate a first period of time and a second period of time in order respectively to finish the calculation of the on-times of the first PWM signal and the second PWM signal.

Please refer to FIG. 3 and FIG. 6. FIG. 6 illustrates that the first time calculator 121 and the second time calculator 122 calculate a first period of time T1 and a second period of time T2 in order respectively to finish the calculation of the on-times of the first PWM signal PWM1 and the second PWM signal PWM2. At the first time K1, if the comparator 10 determines that the first input signal V1 is higher than the second input signal V2, the comparator 10 will provide the setting signal SET to the first time calculator 121 and the first multiplexer 141.

At this time, the first multiplexer 141 will set the first PWM signal PWM1 corresponding to the first phase channel 161 at high level according to the setting signal SET, and the first time calculator 121 will start to calculate the first period of time T1 corresponding to the first PWM signal PWM1 from the first time K1 according to the setting signal SET, and the first PWM signal PWM1 will enter into the idle state after the calculation is finished.

After the first time calculator 121 enters into the idle state, the second time calculator 122 will continue to start to calculate the second period of time T2 corresponding to the first PWM signal PWM1 from the second time K2. In this embodiment, the time calculating unit 12 only includes the first time calculator 121 and the second time calculator 122. When the second time calculator 122 finishes the calculation of the second period of time T2 corresponding to the first PWM signal PWM1, the second time calculator 122 will output a reset signal RESET to the second multiplexer 142 and enter into the idle state.

Then, at the third time K3, the second multiplexer 142 sets the first PWM signal PWM1 at low level according to the reset signal RESET. Therefore, the duty cycle t1 of the first on-time corresponding to the first phase channel 161 is started from the first multiplexer 141 setting the first PWM signal PWM1 at high level according to the setting signal SET until the second multiplexer 142 setting the first PWM signal PWM1 at low level according to the reset signal RESET.

At the fourth time K4, if the comparator 10 determines again that the first input signal V1 is higher than the second input signal V2, the comparator 10 will output the setting signal SET to the first time calculator 121 and the first multiplexer 141. At this time, the first multiplexer 141 will set the second PWM signal PWM2 corresponding to the second phase channel 162 at high level according to the setting signal SET.

At this time, no matter the second time calculator 122 performs calculation or not, if the first time calculator 121 is under the idle state, the first time calculator 121 can start to calculate the first period of time T1 corresponding to the second PWM signal PWM2 at the fourth time K4 according to the setting signal SET, and the first time calculator 121 will enter into the idle state after the calculation is finished.

After the first time calculator 121 finishes the calculation, if the second time calculator 122 is under the idle state, the second time calculator 122 will continue to start to calculate the second period of time T2 corresponding to the second PWM signal PWM2 from the fifth time K5. When the second time calculator 122 finishes the calculation of the second period of time T2 corresponding to the second PWM signal PWM2, the second time calculator 122 will output the reset signal RESET to the second multiplexer 142 and enter into the idle state.

Then, at the sixth time K6, the second multiplexer 142 sets the second PWM signal PWM2 at low level according to the reset signal RESET. Therefore, the duty cycle t2 of the second on-time corresponding to the second phase channel 162 is started from the first multiplexer 141 setting the second PWM signal PWM2 at high level according to the setting signal SET until the second multiplexer 142 setting the second PWM signal PWM2 at low level according to the reset signal RESET.

Similarly, at the seventh time (not shown in the figures), if the comparator 10 determines again that the first input signal V1 is higher than the second input signal V2, the comparator 10 will output the setting signal SET to the first time calculator 121 and the first multiplexer 141. At this time, the first multiplexer 141 will set the third PWM signal PWM3 corresponding to the third phase channel 163 at high level according to the setting signal SET.

No matter the second time calculator 122 performs calculation or not at this time, if the first time calculator 121 is under the idle state, the first time calculator 121 can start to calculate the first period of time T1 corresponding to the third PWM signal PWM3 at the seventh time according to the setting signal SET, and the first time calculator 121 will enter into the idle state after the calculation is finished.

At this time, if the second time calculator 122 is under the idle state, the second time calculator 122 will continue to start to calculate the second period of time T2 corresponding to the third PWM signal PWM3 from the eighth time. When the second time calculator 122 finishes the calculation of the second period of time T2 corresponding to the third PWM signal PWM3, the second time calculator 122 will output the reset signal RESET to the second multiplexer 142 and enter into the idle state.

Then, at the ninth time, the second multiplexer 142 sets the third PWM signal PWM3 at low level according to the reset signal RESET. Therefore, the duty cycle of the third on-time corresponding to the third phase channel 163 is started from the first multiplexer 141 setting the third PWM signal PWM3 at high level according to the setting signal SET until the second multiplexer 142 setting the third PWM signal PWM3 at low level according to the reset signal RESET.

Similarly, at the tenth time (not shown in the figures), if the comparator 10 determines again that the first input signal V1 is higher than the second input signal V2, the comparator 10 will output the setting signal SET to the first time calculator 121 and the first multiplexer 141. At this time, the first multiplexer 141 will set the fourth PWM signal PWM4 corresponding to the fourth phase channel 164 at high level according to the setting signal SET.

No matter the second time calculator 122 performs calculation or not at this time, if the first time calculator 121 is under the idle state, the first time calculator 121 can start to calculate the first period of time T1 corresponding to the fourth PWM signal PWM4 at the tenth time according to the setting signal SET, and the first time calculator 121 will enter into the idle state after the calculation is finished.

At this time, if the second time calculator 122 is under the idle state, the second time calculator 122 will continue to start to calculate the second period of time T2 corresponding to the fourth PWM signal PWM4 from the eleventh time. When the second time calculator 122 finishes the calculation of the second period of time T2 corresponding to the fourth PWM signal PWM4, the second time calculator 122 will output the reset signal RESET to the second multiplexer 142 and enter into the idle state.

Then, at the twelfth time, the second multiplexer 142 sets the fourth PWM signal PWM4 at low level according to the reset signal RESET. Therefore, the duty cycle of the fourth on-time corresponding to the fourth phase channel 164 is started from the first multiplexer 141 setting the fourth PWM signal PWM4 at high level according to the setting signal SET until the second multiplexer 142 setting the fourth PWM signal PWM4 at low level according to the reset signal RESET.

Figure 7:
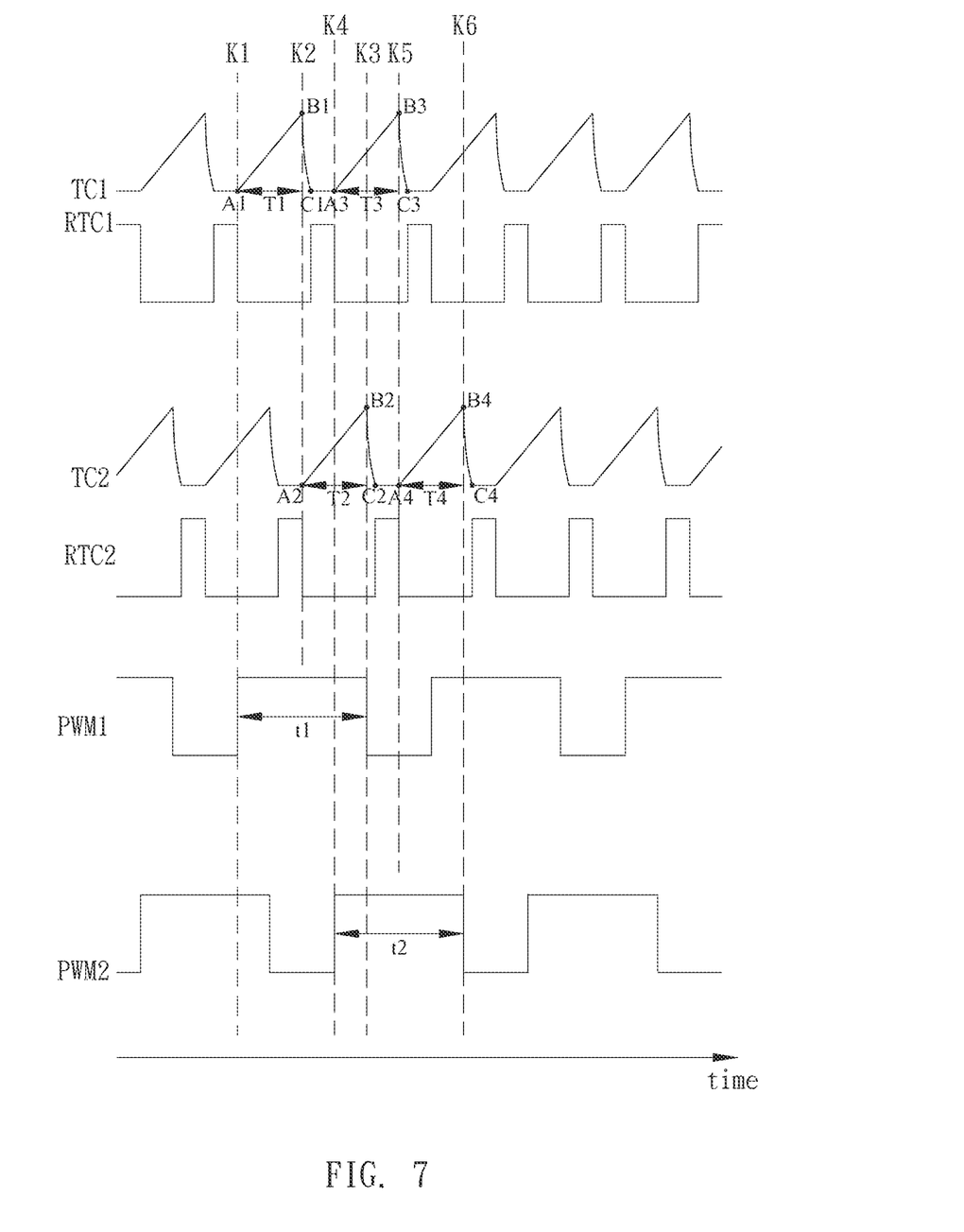
FIG. 7 illustrates a schematic diagram of the overlapped on-time duty cycles of the first PWM signal and the second PWM signal of the invention when the output voltage is higher.
Figure 8:
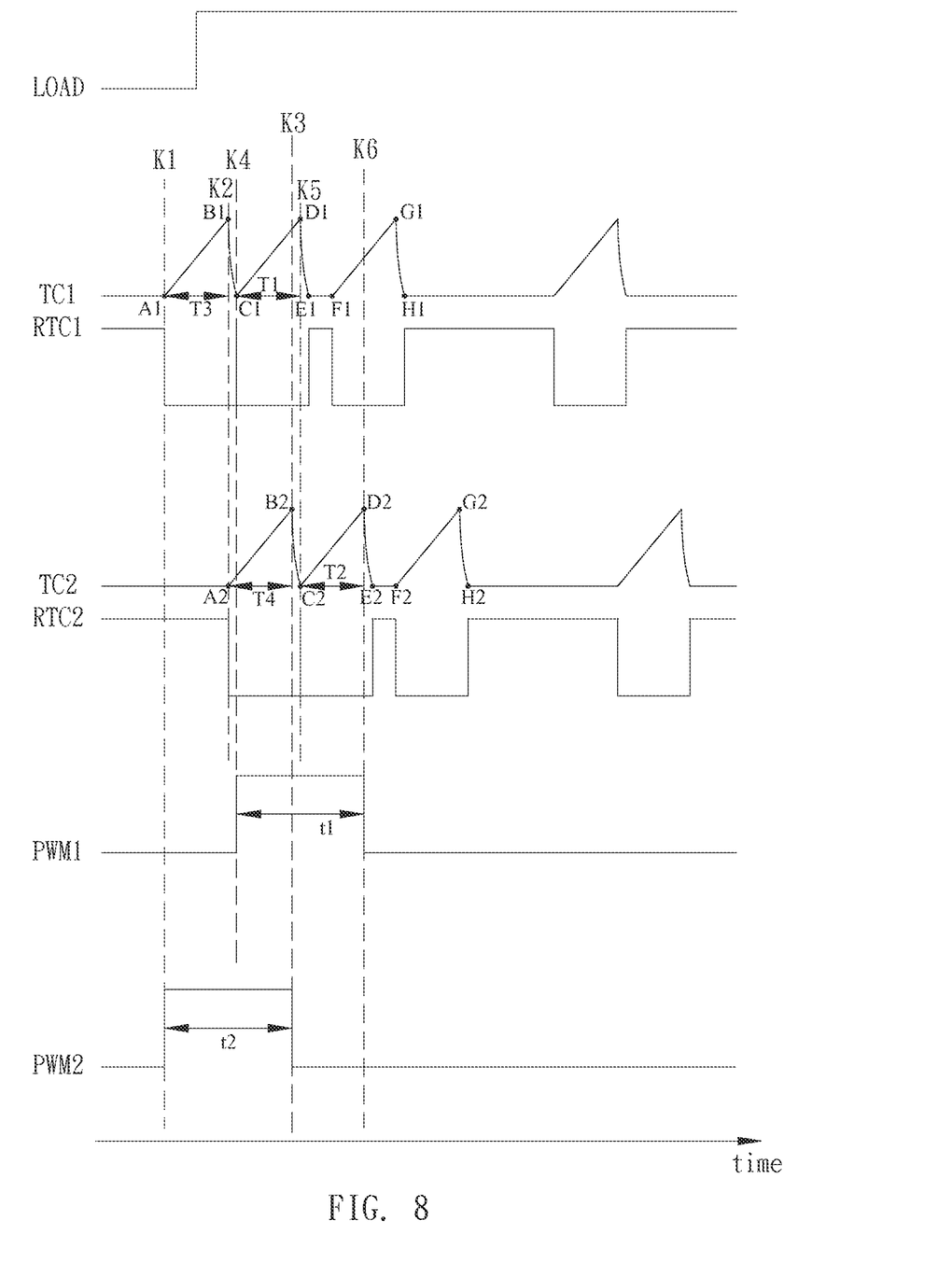
FIG. 8 illustrates a schematic diagram of the overlapped on-time duty cycles of the first PWM signal and the second PWM signal of the invention when the load becomes larger to increase the speed of the transient response.

In practical applications, the first period of time T1 and the second period of time T2 calculated by the first time calculator 121 and the second time calculator 122 in order corresponding to the same PWM signal (for example, the first PWM signal PWM1~the fourth PWM signal PWM4) can be continuous (as shown in FIG. 6~FIG. 8) or there is a time gap between them.

In addition, the first time calculator 121 and the second time calculator 122 of the time calculating unit 12 can be not related to the output voltage Vout and the input voltage of the DC-DC converter 1, or at least one time calculator (for example, the first time calculator 121 or the second time calculator 122) is related to the output voltage Vout and the input voltage of the DC-DC converter 1.

In this embodiment, the current balance unit 18 coupled to the first time calculator 121 and the second time calculator 122 respectively is used to perform current balance correction on at least one of the first time calculator 121 and the second time calculator 122 according to the first sensing current ISEN1~the fourth sensing current ISEN4 corresponding to the first phase channel 161~the fourth phase channel 164 respectively.

As shown in FIG. 6, at the first time K1, when the first multiplexer 141 sets the first PWM signal PWM1 corresponding to the first phase channel 161 at high level according to the setting signal SET, the first time calculator 121 will start to calculate the first period of time T1 (from A1 to B1 on the first time calculation signal TC1) corresponding to the first duty cycle t1 of the first on-time of the first phase channel 161 until the second time K2, and then the first time calculator 121 will enter into the idle state.

Then, the second time calculator 122 will continuously calculate another period of time T2 (from A2 to B2 on the second time calculation signal TC2) corresponding to the first duty cycle t1 of the first on-time of the first phase channel 161 until the third time K3, and then the second time calculator 122 will output the reset signal RESET and enter into the idle state.

Similarly, at the fourth time K4, when the first multiplexer 141 sets the second PWM signal PWM2 corresponding to the second phase channel 162 at high level according to the setting signal SET, since at this time the first time calculator 121 is under the idle state and no on-time calculation is performed by the second time calculator 122, the first time calculator 121 can start to calculate the third period of time T3 (from A3 to B3 on the first time calculation signal TC1) corresponding to the second duty cycle t2 of the second on-time of the second phase channel 162 until the fifth time K5, and then the first time calculator 121 will enter into the idle state.

It should be noticed that the fourth time K4 in this embodiment is later than the above-mentioned third time K3, that is to say, the fourth time K4 that the first multiplexer 141 sets the second PWM signal PWM2 corresponding to the second phase channel 162 at high level is later than the third time K3 that the second time calculator 122 finishes the calculation of another period of time T2 (from A2 to B2 on the second time calculation signal TC2) and outputs the reset signal RESET.

After the first time calculator 121 finishes the calculation of the third period of time T3 until the fifth time K5, because the second time calculator 122 is already under the idle state at this time, the second time calculator 122 can continuously calculate another period of time T4 (from A4 to B4 on the second time calculation signal TC2) corresponding to the second duty cycle t2 of the second on-time of the second phase channel 162 until the sixth time K6, and then the second time calculator 122 will output the reset signal RESET and enter into the idle state.

Please refer to FIG. 7. FIG. 7 illustrates a schematic diagram of the overlapped on-time duty cycles of the first PWM signal and the second PWM signal of the invention when the output voltage is higher.

As shown in FIG. 7, at the first time K1, when the first multiplexer 141 sets the first PWM signal PWM1 corresponding to the first phase channel 161 at high level according to the setting signal SET, the first time calculator 121 will start to calculate the first period of time T1 (from A1 to B1 on the first time calculation signal TC1) corresponding to the first duty cycle t1 of the first on-time of the first phase channel 161 until the second time K2, and then the first time calculator 121 will enter into the idle state.

Then, the second time calculator 122 will continuously calculate another period of time T2 (from A2 to B2 on the second time calculation signal TC2) corresponding to the first duty cycle t1 of the first on-time of the first phase channel 161 until the third time K3, and then the second time calculator 122 will output the reset signal RESET and enter into the idle state.

Similarly, at the fourth time K4, when the first multiplexer 141 sets the second PWM signal PWM2 corresponding to the second phase channel 162 at high level according to the setting signal SET, since at this time the first time calculator 121 is under the idle state, even the second time calculator 122 is still performing on-time calculation, the first time calculator 121 can start to calculate the third period of time T3 (from A3 to B3 on the first time calculation signal TC1) corresponding to the second duty cycle t2 of the second on-time of the second phase channel 162 until the fifth time K5, and then the first time calculator 121 will enter into the idle state.

It should be noticed that the fourth time K4 in this embodiment is later than the above-mentioned third time K3, that is to say, the fourth time K4 that the first multiplexer 141 sets the second PWM signal PWM2 corresponding to the second phase channel 162 at high level is later than the third time K3 that the second time calculator 122 finishes the calculation of another period of time T2 (from A2 to B2 on the second time calculation signal TC2) corresponding to the first duty cycle t1 of the first on-time of the first phase channel 161 and outputs the reset signal RESET.

After the first time calculator 121 finishes the calculation of the third period of time T3 until the fifth time K5, because the second time calculator 122 is already under the idle state at this time, the second time calculator 122 can continuously calculate another period of time T4 (from A4 to B4 on the second time calculation signal TC2) corresponding to the second duty cycle t2 of the second on-time of the second phase channel 162 until the sixth time K6, and then the second time calculator 122 will output the reset signal RESET and enter into the idle state.

From above, it can be known that the first time calculator 121 and the second time calculator 122 calculate two periods of time T1 and T2 in order to obtain the first duty cycle t1 of the first on-time of the first PWM signal PWM1 of the first phase channel 161, and the first time calculator 121 and the second time calculator 122 calculate two periods of time T3 and T4 in order to obtain the second duty cycle t2 of the second on-time of the second PWM signal PWM2 of the second phase channel 162.

When the output voltage is higher, the first duty cycle t1 of the first on-time of the first PWM signal PWM1 and the second duty cycle t2 of the second on-time of the second PWM signal PWM2 will be overlapped to each other.

Please refer to FIG. 8. FIG. 8 illustrates a schematic diagram of the overlapped on-time duty cycles of the first PWM signal and the second PWM signal of the invention when the load becomes larger to increase the speed of the transient response.

As shown in FIG. 8, at the first time K1, when the first multiplexer 141 sets the second PWM signal PWM2 corresponding to the second phase channel 162 at high level according to the setting signal SET, the first time calculator 121 will start to calculate the third period of time T3 (from A1 to B1 on the first time calculation signal TC1) corresponding to the second duty cycle t2 of the second on-time of the second phase channel 162 until the second time K2, and then the first time calculator 121 will enter into the idle state.

Then, the second time calculator 122 will continuously calculate another period of time T4 (from A2 to B2 on the second time calculation signal TC2) corresponding to the second duty cycle t2 of the second on-time of the second phase channel 162 until the third time K3, and then the second time calculator 122 will output the reset signal RESET and enter into the idle state.

Similarly, at the fourth time K4, when the first multiplexer 141 sets the first PWM signal PWM1 corresponding to the first phase channel 161 at high level according to the setting signal SET, since at this time the first time calculator 121 is under the idle state, even the second time calculator 122 is still performing on-time calculation, the first time calculator 121 can start to calculate the first period of time T3 (from C1 to D1 on the first time calculation signal TC1) corresponding to the first duty cycle t1 of the first on-time of the first phase channel 161 until the fifth time K5, and then the first time calculator 121 will enter into the idle state.

It should be noticed that the fourth time K4 in this embodiment is earlier than the above-mentioned third time K3, that is to say, the fourth time K4 that the first multiplexer 141 sets the first PWM signal PWM1 corresponding to the first phase channel 161 at high level is earlier than the third time K3 that the second time calculator 122 finishes the calculation of another period of time T4 (from A2 to B2 on the second time calculation signal TC2) corresponding to the second duty cycle t2 of the second on-time of the second phase channel 162 and outputs the reset signal RESET.

After the first time calculator 121 finishes the calculation of the first period of time T1 until the fifth time K5, because the second time calculator 122 is already under the idle state at this time, the second time calculator 122 can continuously calculate another period of time T2 (from C2 to D2 on the second time calculation signal TC2) corresponding to the first duty cycle t1 of the first on-time of the first phase channel 161 until the sixth time K6, and then the second time calculator 122 will output the reset signal RESET and enter into the idle state.

It should be noticed that from the load changing signal LOAD in FIG. 8, it can be known that when the load becomes larger, the frequency that the comparator 10 generates the setting signal SET will be increased, and the first duty cycle t1 of the first on-time of the first phase channel 161 and the second duty cycle t2 of the second on-time of the second phase channel 162 will be overlapped to each other; therefore, when the transient phenomenon happens, the speed and capability of the transient response can be effectively increased.

Another embodiment of the invention is an operating method for a power converter. In this embodiment, the power converter includes a multi-phase output stage and a time calculating unit. The multi-phase output stage includes N channels, wherein N is positive integer larger than 1. The time calculating unit includes M time calculators, wherein M is positive integer larger than 1.

Figure 9A:
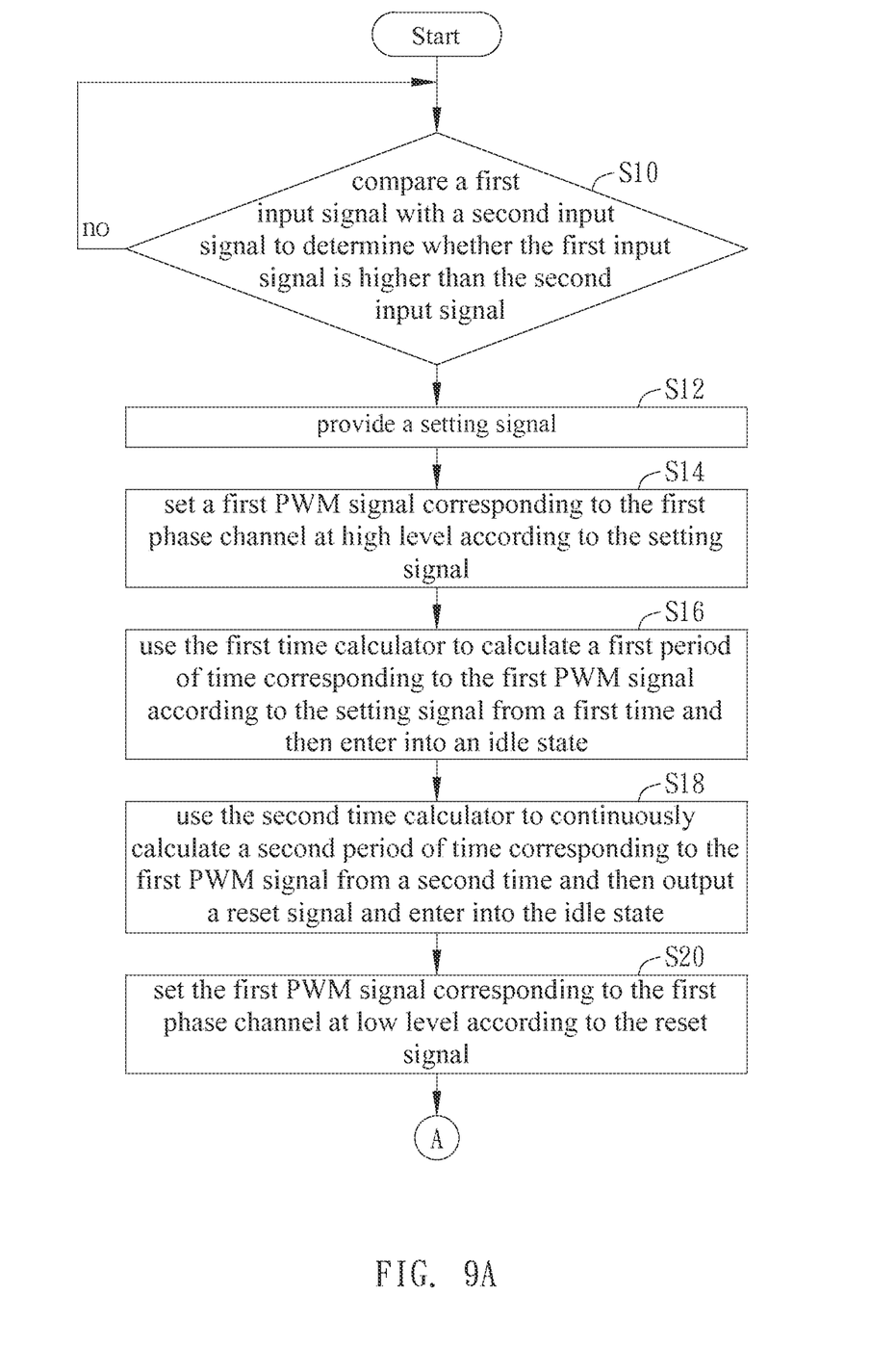
FIG. 9A and FIG. 9B illustrate a flowchart of the operating method for the power converter in another embodiment of the invention.
Figure 9B:
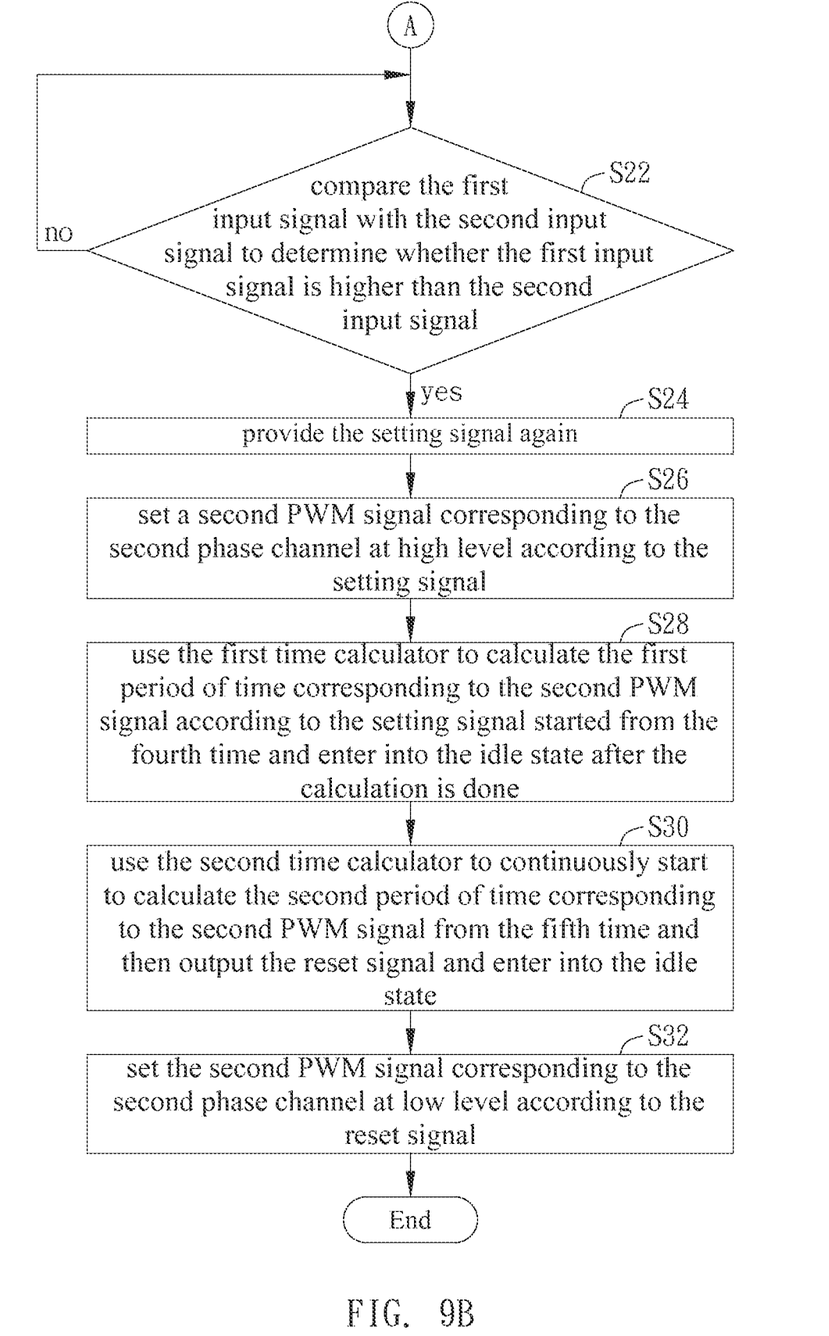

Please refer to FIG. 9A and FIG. 9B. FIG. 9A and FIG. 9B illustrate a flowchart of the operating method for the power converter in this embodiment. In this embodiment, if N=2 and M=2, that is to say, the multi-phase output stage of this embodiment has two phase channels and the time calculating unit includes two time calculators, but not limited to this.

As shown in FIG. 9A, at the first time, the method performs the step S10 to compare a first input signal with a second input signal to determine whether the first input signal is higher than the second input signal. If the judgment result of the step S10 is yes, the method performs the step S12 to provide a setting signal. In the step S14, the method will set a first PWM signal corresponding to the first phase channel at high level according to the setting signal.

In the step S16, the method uses the first time calculator to calculate a first period of time corresponding to the first PWM signal according to the setting signal from a first time and then enter into an idle state. In the step S18, the method uses the second time calculator to continuously calculate a second period of time corresponding to the first PWM signal from a second time and then output a reset signal and enter into the idle state. At the third time, the method performs the step S20 to set the first PWM signal corresponding to the first phase channel at low level according to the reset signal.

Therefore, the duty cycle of the first on-time corresponding to the first phase channel is started from the step S14 that the first multiplexer sets the first PWM signal at high level according to the setting signal (the first time) until the step S20 that the second multiplexer sets the first PWM signal at low level according to the reset signal (the third time).

Then, as shown in FIG. 9B, at the fourth time, the method performs the step S22 to compare the first input signal with the second input signal to determine whether the first input signal is higher than the second input signal. If the judgment result of the step S22 is yes, the method performs the step S24 to provide the setting signal again. In the step S26, the method sets a second PWM signal corresponding to the second phase channel at high level according to the setting signal.

At this time, no matter the second time calculator performs calculation or not, if the first time calculator is under the idle state, in the step S28, the method uses the first time calculator to calculate the first period of time corresponding to the second PWM signal according to the setting signal started from the fourth time and enter into the idle state after the calculation is done.

After the first time calculator finishes the calculation, if the second time calculator is under the idle state at this time, in the step S30, the method uses the second time calculator to continuously start to calculate the second period of time corresponding to the second PWM signal from the fifth time and then output the reset signal and enter into the idle state. Then, at the sixth time, the method performs the step S32 to set the second PWM signal corresponding to the second phase channel at low level according to the reset signal.

Therefore, the duty cycle of the second on-time corresponding to the second phase channel is started from the step S26 that the first multiplexer sets the second PWM signal at high level according to the setting signal (the fourth time) until the step S32 that the second multiplexer sets the second PWM signal at low level according to the reset signal (the sixth time).

Compared to the prior arts, the power converter disclosed in the invention can perform on-time calculations on certain PWM signal during several periods of time in order through the time calculators of the on-time calculating unit. When the first time calculator finishes the calculation of a period of time and the second time calculator continues to perform the calculation of another period of time, the first time calculator will enter into the idle state and it can start to perform on-time calculation on another PWM signal immediately. By doing so, the PWM output signals corresponding to different phase channels can be operated at high level at the same time, namely the on-time duty cycles of each phase channel can be overlapped to each other, so that the output limitations to the output voltage caused by the conventional constant on-time structure can be effectively improved. When transient phenomenon happens, since the on-time duty cycles of each phase channel in the invention can be overlapped to each other, the speed of the transient response can be effectively increased. In addition, since the same on-time calculating unit is used to calculate the on-times of each phase channel in the invention, not only the used circuit area can be reduced, but also the difference between the on-times of each phase channel can be reduced. Furthermore, the invention can also provide output time gap between the phase channels to suppress the loop over-output phenomenon.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power converter, comprising:
   a comparator, for comparing a first input signal with a second input signal to provide a setting signal;
   a time calculating unit, coupled to the comparator, wherein the time calculating unit comprises a first time calculator and a second time calculator, and the time calculating unit uses the first time calculator, the second time calculator, and the setting signal to generate an on-time signal, and the time calculating unit also provides a reset signal;
   a multiplex processing unit, coupled to the comparator and the time calculating unit, for receiving the on-time signal and the reset signal; and
   a multi-phase output stage, coupled to the multiplex processing unit, for providing a plurality of pulse-width modulation (PWM) signals,
   wherein when the load becomes larger, the PWM signals are overlapped.

2. The power converter of claim 1, wherein two input terminals of the comparator are coupled to an error amplifier and a ramp generator, the first input signal is an error signal generated by the error amplifier according to a reference voltage and an output voltage of the power converter and the second input signal is a ramp signal generated by the ramp generator.

3. The power converter of claim 1, wherein the first input signal and the second input signal compared by the comparator are a reference voltage and an output voltage of the power converter respectively.

4. The power converter of claim 1, wherein the multiplex processing unit sets the PWM signals at high level according to the setting signal received from the comparator and sets the PWM signals at low level according to the reset signal received from the time calculating unit.

5. The power converter of claim 4, wherein when the multiplex processing unit sets a first PWM signal of the PWM signals at high level, the first time calculator and the second time calculator calculate a plurality of times to the first PWM signal and provide the reset signal to the multiplex processing unit.

6. The power converter of claim 5, wherein there is a time gap existed between the times calculated by the first time calculator and the second time calculator.

7. The power converter of claim 5, wherein the times calculated by the first time calculator and the second time calculator are continuous.

8. The power converter of claim 5, wherein the time calculating unit comprises a plurality of time calculators including the first time calculator and the second time calculator, the number of the time calculators is M, and M is a positive integer larger than 1, after the first time calculator of the calculators calculates a first period of time corresponding to the first PWM signal according to the setting signal and enters into an idle state, and the second time calculator though a Mth time calculator of the time calculators calculate a second period of time through a Mth period of time corresponding to the first PWM signal in order and enter into the idle state respectively, after the Mth time calculator calculates the Mth period of time, the Mth time calculator outputs the reset signal to the multiplex processing unit.

9. The power converter of claim 8, wherein when the multiplex processing unit sets a second PWM signal of the PWM signals at high level according to the setting signal, if the first time calculator is under the idle state, the first time calculator will calculate the first period of time corresponding to the second PWM signal according to the setting signal and enter into the idle state, and the second time calculator though the Mth time calculator of the time calculators calculate the second period of time through the Mth period of time corresponding to the second PWM signal in order and enter into the idle state respectively, after the Mth time calculator calculates the Mth period of time, the Mth time calculator will output the reset signal to the multiplex processing unit to make the multiplex processing unit set the second PWM signal under low level according to the reset signal.

10. The power converter of claim 1, wherein at least one of the first time calculator and the second time calculator is related to an output voltage and an input voltage of the power converter.

11. The power converter of claim 1, wherein the first time calculator and the second time calculator are not related to an output voltage and an input voltage of the power converter.

12. The power converter of claim 4, wherein the multiplex processing unit comprises a first multiplexer and a second multiplexer, the first multiplexer is coupled to the comparator, the time calculating unit, and the multi-phase output stage and the first multiplexer is used to set the PWM signals at high level according to the setting signal respectively, and the second multiplexer is coupled to the time calculating unit and the multi-phase output stage and the second multiplexer is used to set the PWM signals at low level according to the reset signal received from the time calculating unit respectively.

13. An operating method for a power converter, the power converter comprising a multi-phase output stage, a multiplex processing unit, and a time calculating unit, the time calculating unit comprising a first time calculator and a second time calculator, the operating method comprising steps of:
  (a) comparing a first input signal with a second input signal and selectively providing a setting signal;
  (b) the time calculating unit using the first time calculator, the second time calculator, and the setting signal to generate an on-time signal, and the time calculating unit also providing a reset signal;
  (c) the multiplex processing unit receiving the on-time signal and the reset signal; and
  (d) the multi-phase output stage providing a plurality of pulse-width modulation (PWM) signals,
wherein when the load becomes larger, the PWM signals are overlapped.

14. The operating method of claim 13, wherein the first input signal and the second input signal compared in step (a) are an error signal generated by an error amplifier according to a reference voltage and an output voltage of the power converter and a ramp signal generated by a ramp generator respectively.

15. The operating method of claim 13, wherein the first input signal and the second input signal compared in step (a) are a reference voltage and an output voltage of the power converter respectively.

16. The operating method of claim 13, further comprising the steps of:
  setting the PWM signals at high level according to the setting signal respectively; and
  setting the PWM signals at low level according to the reset signal respectively.

* * * * *